US005751523A

United States Patent [19]

Ballard et al.

[11] Patent Number: 5,751,523

[45] Date of Patent: May 12, 1998

[54] SECONDARY GROUND FAULT PROTECTED LUMINOUS TUBE TRANSFORMER FOR MID-POINT CONNECTED LUMINOUS TUBES

[75] Inventors: Gerald L. Ballard; William L. Brosius, both of Brandon, Miss.

[73] Assignee: Magnetek Corporation, Nashville, Tenn.

[21] Appl. No.: 715,873

[22] Filed: Sep. 19, 1996

[51] Int. Cl.[6] .................... H02H 3/00

[52] U.S. Cl. .................... 361/42; 361/35; 315/122

[58] Field of Search .................... 361/35, 42–44, 361/49; 315/307, DIG. 5, DIG. 7, 119, 122

[56] References Cited

U.S. PATENT DOCUMENTS

| | | | |
|---|---|---|---|
| 1,786,422 | 12/1930 | Daley | 336/165 |
| 3,666,993 | 5/1972 | Legatti | 361/49 |
| 4,507,698 | 3/1985 | Nilssen | 361/42 |
| 5,241,443 | 8/1993 | Efantis | 361/36 |
| 5,387,845 | 2/1995 | Nilssen | 315/209 |

*Primary Examiner*—Jeffrey A. Gaffin
*Assistant Examiner*—Sally C. Medley
*Attorney, Agent, or Firm*—Mark P. Bourgeois; Waddey & Patterson

[57] ABSTRACT

A low cost power supply for neon lamps provides enhanced safety protection. The power supply has a transformer with a return path which is separate from the earth ground so that a fault current can be detected. The power supply has a mid-point connected secondary coil design which operates a mid-point connected neon lamp configuration. A protection circuit detects the fault current flowing between the output terminals and the earth ground. When the fault current is detected, the protection circuit disconnects the input power from the primary winding. An input power reset is required to restart the power supply once the protection circuit has operated.

10 Claims, 6 Drawing Sheets

SECONDARY GROUND FAULT PROTECTED LUMINOUS TUBE TRANSFORMER FOR MID-POINT CONNECTED LUMINOUS TUBES

BACKGROUND OF THE INVENTION

This invention relates to transformers used for supplying power to luminous tubes such as neon gas discharge lamps. More specifically, it relates to mid-point grounded neon transformers which drive a lamp configuration that has two return paths. This luminous tube configuration is referred to as a midpoint connected tube or lamp. The invention includes a ground fault protection circuit that disconnects power to the transformer in the event a fault condition is sensed. Such a situation would occur if arcing from one of the secondary side wires to ground were to occur. This would represent a potential hazard.

Currently, in neon tube transformers that are being used the output voltage from one output terminal to ground cannot exceed 7500 volts. To provide a design capable of producing output voltages in excess of 7500 volts, a mid-point grounded secondary is employed in which two secondary coils are used. These coils produce voltages that are 180 degrees out of phase with each other. A voltage is developed then between the two secondary terminals that is twice that measured from any one terminal to ground. The midpoint grounded transformer is constructed with one end of each secondary winding tied to a grounded common point. Additionally, the core of the transformer is tied with the grounded common point.

FIG. 1 shows a diagram of a prior art neon transformer with series tube connections. Referring to FIG. 1, transformer housing 10 contains a transformer T1 with primary winding TW3 and secondary windings TW1 and TW2. A source of AC power (not shown) supplies power to primary side input terminals P1 and P2. A midpoint terminal P3 connects the windings TW1 and TW2 to ground. The transformer core C1 is connected to ground through terminal GND. Housing 10 is also grounded. Secondary output terminals S1 and S2 are series connected to neon tubes B1, B2, B3 and B4 by wires W1 and W2. Insulators I1 and I2 surround output terminals S1 and S2. During operation the transformer T1 steps up the voltage between S1 and S2 to a high enough voltage to strike and operate the neon tubes. Once the lamps have struck the leakage inductance of the transformer limits the current drawn by the neon tubes. The maximum allowable voltage between S1 or S2 and ground would be 7500 volts. This would result in a voltage between S1 and S2 of twice the terminal to ground voltage or 15,000 volts maximum. One problem with this prior art design is that the length of high voltage wires (W1 and W2) connecting between the secondary terminals S1 and S2 is lengthy and results in added costs. Additionally, excessive length of wires W1 and W2 can result in parasitic capacitive coupling of the voltage signal to ground. Such coupling results in insufficient voltage being delivered to the neon tubes, causing the neon tubes to flicker. These high voltage wires have to be rated to withstand 7500 volts. That problem has been overcome with the prior art design shown in FIG. 2.

FIG. 2 shows a diagram of another prior art neon transformer. Referring to FIG. 2, the neon tube connections of FIG. 1 have been modified to a midpoint grounded tube configuration. Secondary output terminal S1 is connected to neon tube B2 by wire W1, tube B2 is connected to tube B1. Tube B1 is connected by wire W3 to ground terminal GND. Similarly, secondary output terminal S2 is connected to neon tube B3 by wire W2, tube B3 is connected to tube B4. Tube B4 is connected by wire W4 to ground terminal GND. This configuration minimizes the length of output wiring energized at a high voltage level. If the transformer is located close to the neon tubes, the length of high voltage wires W1 and W2 can be short. By reducing the length of wires W1 and W2, the capacitive coupling effect is minimized. Wires W3 and W4 can be lengthy.

Neon tubes typically are custom made for a particular application. As such their gas pressures, mixtures and amount of mercury introduced into the tube are quite variable. These different tube characteristics result in very non-uniform amounts of voltage and current drawn by each tube. Further, neon lamps contain a tungsten filament in each end of the lamp which is coated with an emissive material that has a lower work function than tungsten. As the lamps age, the emissive coating material on the filaments is worn away so that the arc must flow from the bare tungsten filament. The work function of the tungsten filament is high, so several watts of power are dissipated in the cathode fall region near the filament. This extra power dissipation means that one lamp will draw more power than others. When a lamp with a worn-out filament is operating with a high cathode fall voltage, the arc voltage increases. The arc voltage may become asymmetrical if one filament is more worn than the other. When using a midpoint grounded neon tube configuration with a mid-point grounded neon transformer, the current and power levels between each of the current paths (through lamp B1 and B2 or B3 and B4) can be expected to vary. They will rarely stay equal.

In order to increase the safety of utilizing such a high voltage, it is advantageous to protect property coming in contact with the transformer. The intent is to detect a secondary side fault to ground as a measure to reduce any potential hazards that may exist. It is desirable for the transformer and the lamp when operating to be able to reliably control secondary faults such that fault paths from the secondary side to ground are not permitted to develop at any time.

The use of mid-point grounded neon transformers is well known in the art having been shown as illustrated by U.S. Pat. No. 1,786,422 to Daley. It shows a mid-point grounded transformer assembly for neon lamps. It does not show any ground fault protection for a neon transformer. A prior art protection scheme for a neon power supply is shown in U.S. Pat. No. 5,387,845 to Nilssen. This protection circuit is designed to work with a high frequency inverter power supply to protect the inverter from self-destruction should the lamps fail to ignite. When the neon lamps fail to ignite, the secondary winding is detuned by switching in additional capacitance thus limiting the output voltage to a few hundred volts. This patent does not show any ground fault protection scheme to totally remove power from the circuit in response to a fault condition. Further, it would not work with a low frequency transformer type neon lamp power supply. U.S. Pat. No. 3,666,993 shows a complex ground fault sensing circuit for use with an isolated transformer. It does not show using a midpoint grounded lamp or luminous tube configuration. U.S. Pat. No. 5,241,443 shows a secondary ground fault protection circuit for use with a neon transformer. It uses a capacitive plate in the transformer as the sensor. It does not show using a midpoint grounded lamp or luminous tube configuration.

A currently unmet need exists for a simple and inexpensive neon transformer for mid-point connected lamps that provides secondary side ground fault protection to enhance safety.

SUMMARY

An object of the invention is to provide a low cost power supply for neon lamps with enhanced safety protection. Another object of the invention is to provide a power supply with a return path which is separate from earth ground so a ground fault current does not flow through the return path. An object of the invention is to provide a transformer for mid-point connected neon lamp loads that has secondary ground fault protection. Another object of the invention is to provide a gas discharge tube or lamp power supply design with a mid-point tube connection feature that is not susceptible to nuisance tripping due to load imbalances in either of the current paths. Still yet another object of the invention is to provide a neon lamp power supply design with secondary ground fault protection, for operating lamp lengths or footages that generally require 7500 volts to 15000 volts for proper operation.

A transformer assembly for powering a load and particularly a mid-point connected neon or luminous tube load. The assembly has output terminals connected to the load and provides a high voltage to the load. The assembly has a transformer with a primary winding and one or more secondary windings. The secondary windings are connected to the output terminals and have a midpoint terminal. A housing contains the transformer. Input terminals are connected to the primary winding and operate to receive a source of power. A ground terminal is connected to an earth ground and to the housing. A return terminal is connected to the mid-point terminal and to the load and operates to provide a return path which is separate from the earth ground. The assembly includes a ground fault protection circuit. The protection circuit is connected between the ground terminal and the return terminal. The protection circuit detects a fault current flowing between the output terminals and the earth ground. When it senses a fault current, the protection circuit disconnects the source of power from the primary winding. The ground fault protection circuit has a sensor means connected between a secondary winding midpoint terminal and ground. The sensor means operates to detect a fault current flowing between the output terminals and the earth ground. The protection circuit also has a control means connected to the sensor means, the control means operates to disconnect the source of power from the primary winding in response to detecting the fault current such that the fault current is prevented from flowing.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PREFERRED EMBODIMENTS

Figure 1:
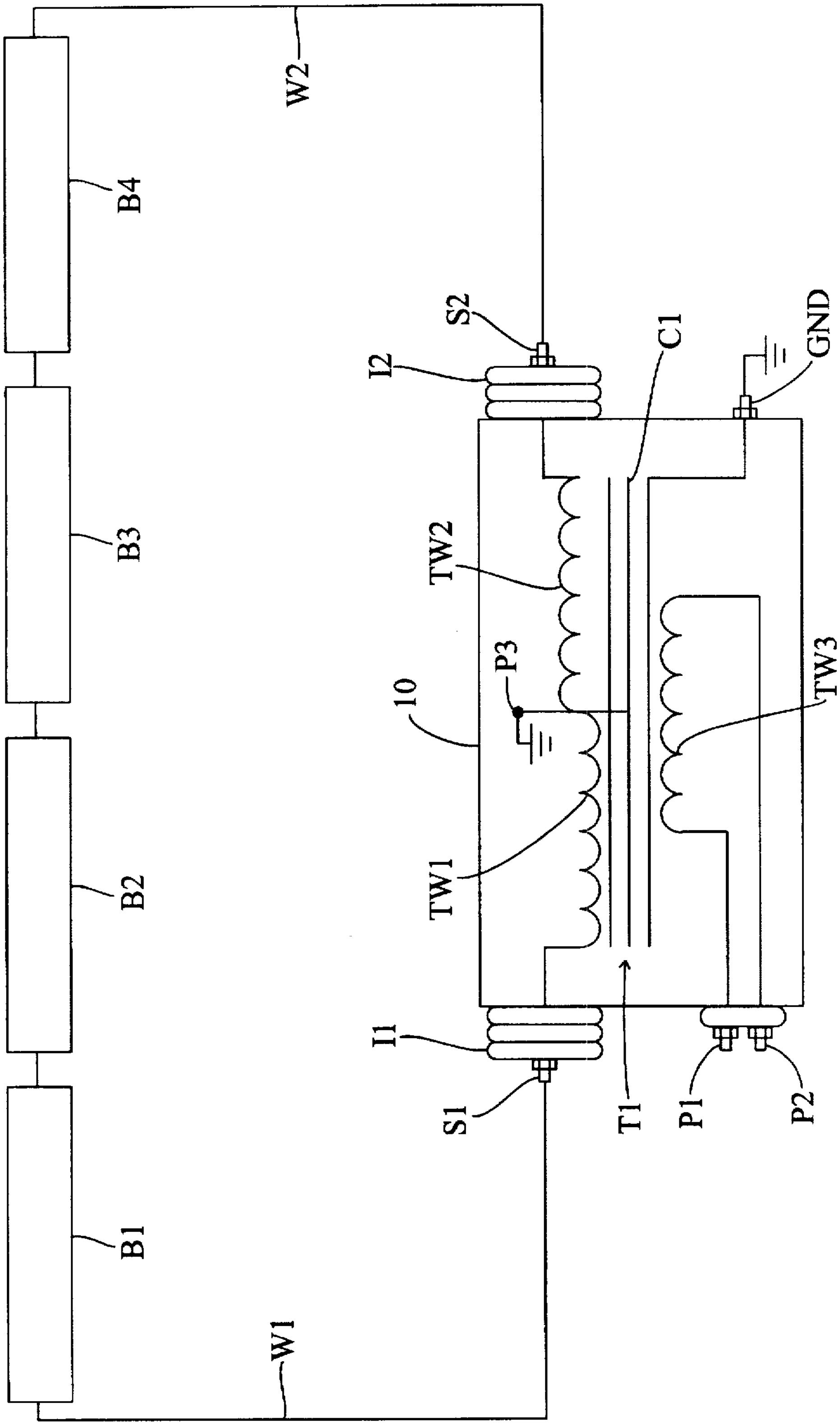
FIG. 1 (PRIOR ART)
FIG. 1 is a diagram of a prior art mid-point grounded neon transformer and series lamp connection configuration.
Figure 3:
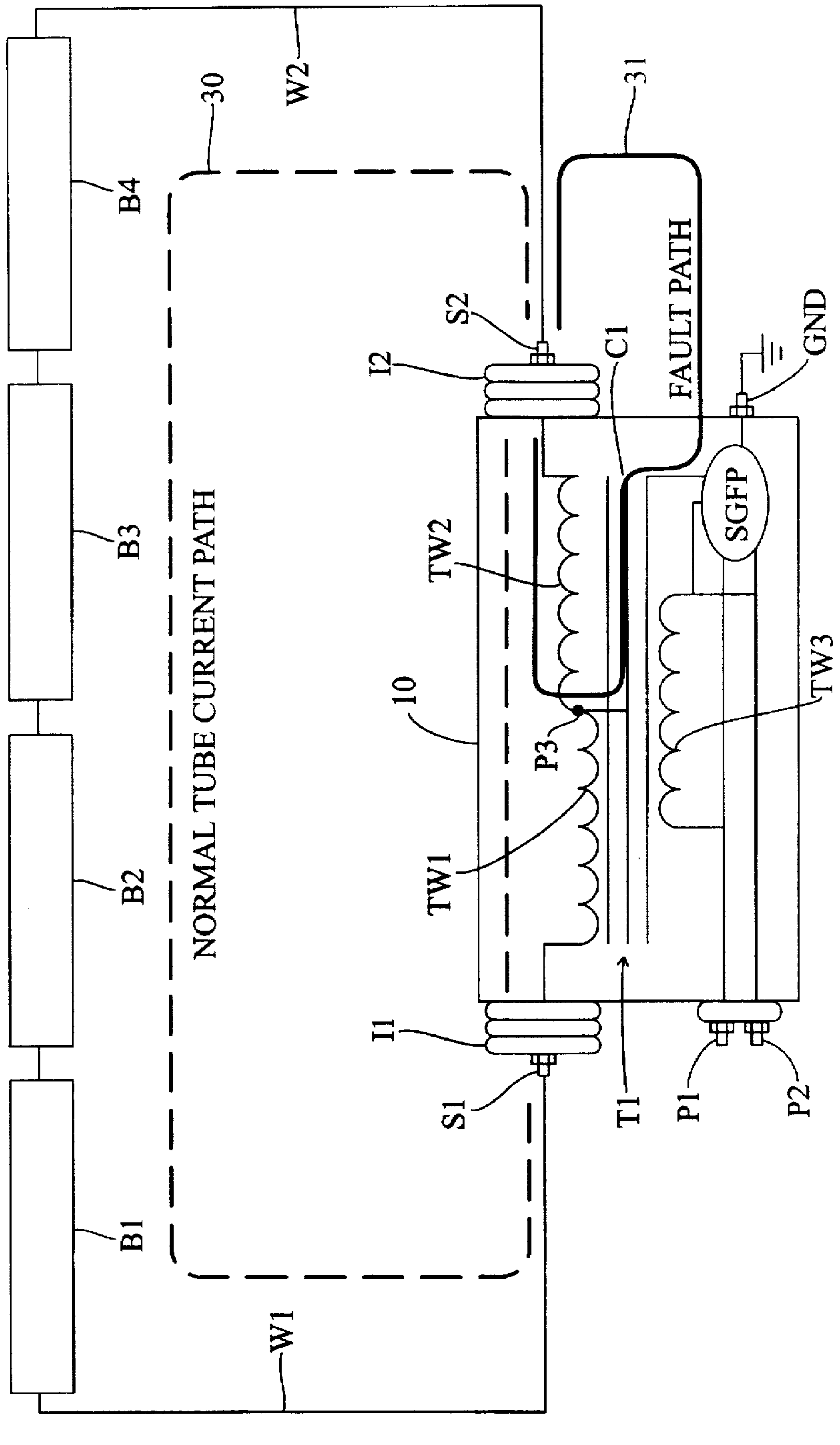
FIG. 3 is a diagram of a proposed neon transformer and series lamp connection configuration with the addition of a ground fault protection device.

FIG. 3 shows a diagram of a proposed neon transformer and series lamp connection configuration with the addition of a ground fault protection device. The neon transformer of FIG. 1 has been modified to include a secondary ground fault protection circuit block labeled SGFP. Block SGFP has connections to primary terminals P1 and P2, primary winding TW3, terminal GND, and the core C1 of transformer T1 which is in common with the mid-point terminal P3. Traditional ground fault sensing circuits detect a current differential between the neutral and the hot leads. In this case, it is desired to detect an abnormal current on the secondary side of the transformer where no neutral exists and the hot lead is at several kilovolts. Block SGFP contains a sensor means and a control means such as a relay. During normal operations the flow of current will be as shown by path 30. The current flows through path 30 established by terminal P3, transformer secondary winding TW2, output terminal S2, wire W2, luminous neon tubes B4, B3,B2 and B1, wire W1, output terminal S1, secondary windings TW1 and back to terminal P3. For the other half of the cycle the current will flow from output terminal S1 through the neon tubes. A secondary side fault would be detected if any current were to flow from either of the hot conductors W1 or W2 to ground and through the SGFP back to the coil midpoint. This is illustrated by path 31. A relay in the SGFP block would open or close to disconnect the primary side of the circuit from the source of AC power (not shown).

Figure 2:
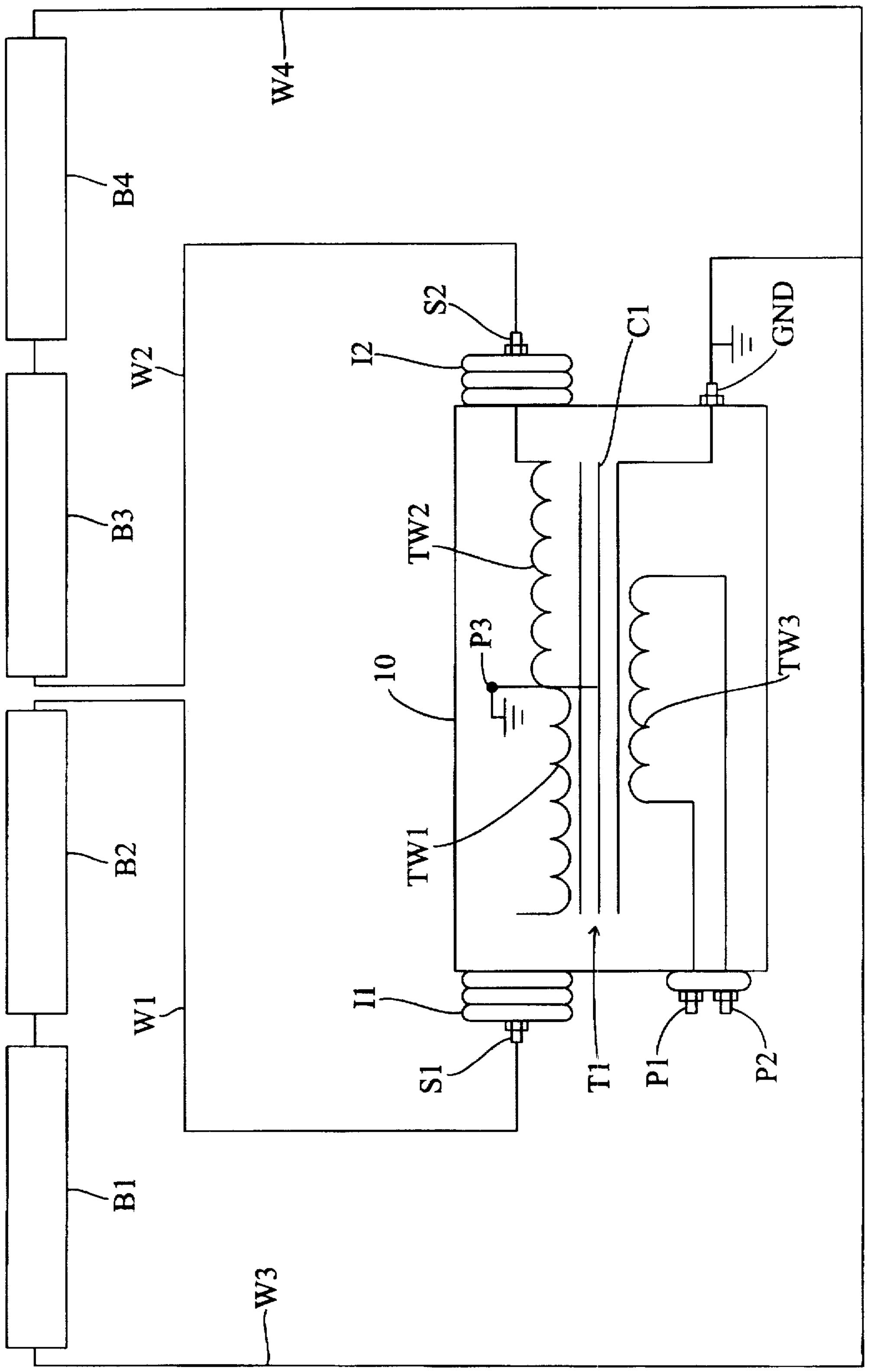
FIG. 2 (PRIOR ART)
FIG. 2 is a diagram of a prior art mid-point grounded neon transformer and mid-point connected lamp configuration.
Figure 4:
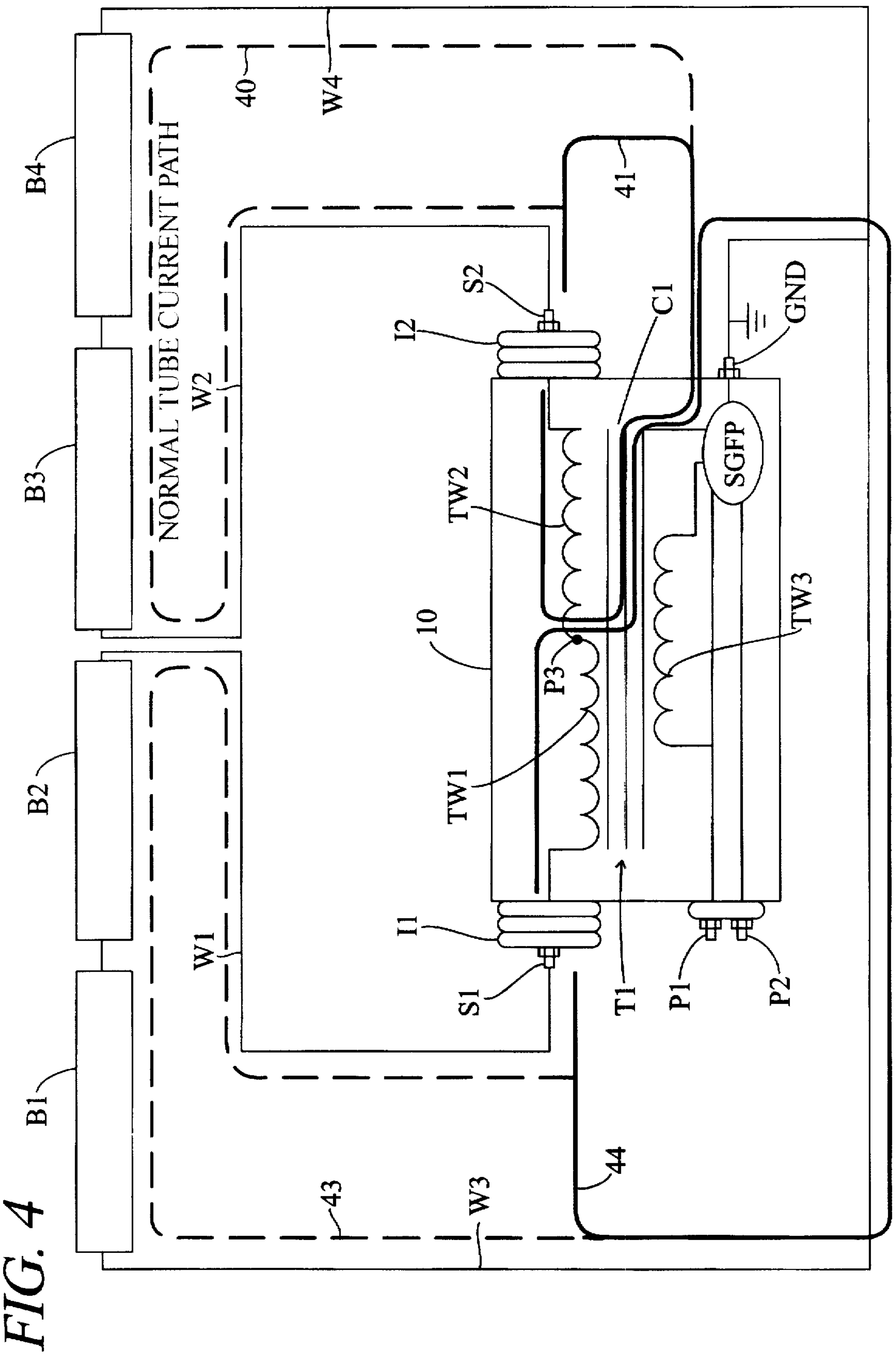
FIG. 4 is a diagram of a proposed neon transformer and mid-point connected lamp configuration that includes the addition of a ground fault protection device.

FIG. 4 shows a diagram of a proposed neon transformer and midpoint grounded lamp connection configuration with the addition of a ground fault protection device. The neon transformer of FIG. 2 has been modified to include a secondary ground fault protection circuit block labeled SGFP. Block SGFP has connections to primary terminals P1 and P2, primary winding TW3, terminal GND, and the core C1 of transformer T1 which is in common with the midpoint terminal P3. Block SGFP again is a voltage sensor and a relay. During normal operations the flow of current will be as shown by path 40. The current will flow for half of the cycle from terminal S2 through wire W2, neon tubes B3 and B4, through wire W4 to terminal GND, through SGFP, terminal P3 and winding TW2 to complete the path. For the other half of the cycle the current flow will be reversed. Similarly, for tubes B1 and B2, during normal operations the flow of current will be as shown by path 43. The current will flow for half of the cycle from output terminal S1 through wire W1, neon tubes B2 and B1, through wire W3 to terminal GND, through SGFP, terminal P3 and winding TW1 to complete the path. For the other half of the cycle, the current flow will be reversed. A secondary side fault path in this configuration would be detected if any current were to flow from either of the hot conductors W1 or W2 to ground and through the SGFP back to the coil midpoint. This is illustrated by paths 41 and 44. A relay in the SGFP block would open or close to disconnect the primary side of the circuit from the source of AC power (not shown). Notice that the normal current path and the fault path are the same. Thus it is not possible to differentiate between normal currents and fault currents. Further, any imbalance between the current flowing from terminal S2 to ground and from terminal S1 to ground will appear as a ground fault and cause an unnecessary tripping of the SGFP circuit. Such imbalances can easily occur as the lamps age and degrade. Clearly such a system is not workable.

Figure 5:
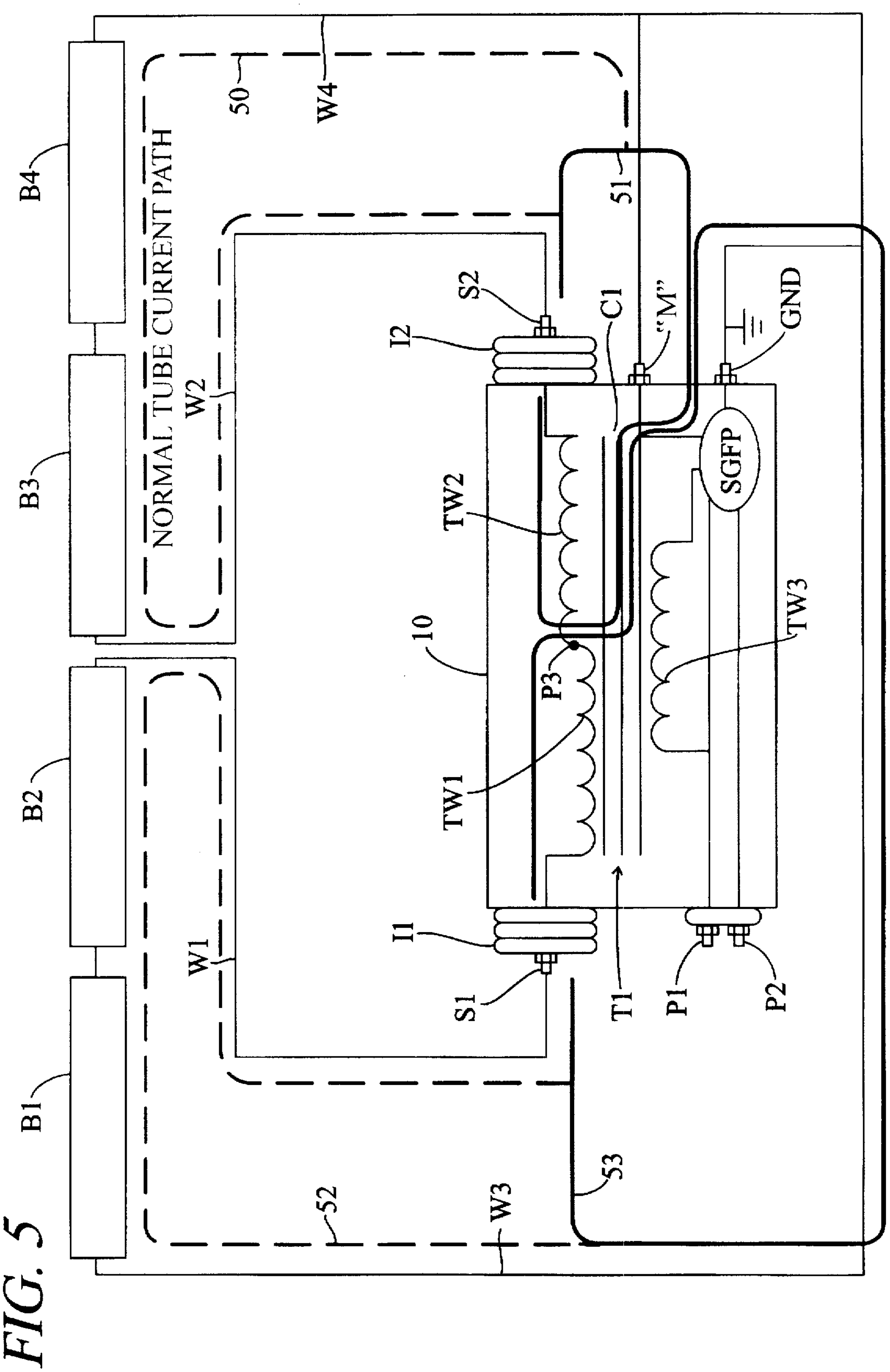
FIG. 5 is a diagram of the preferred embodiment of the present invention. It includes a transformer for mid point connected luminous tube loads that allow proper operation with a ground fault protection circuit.

FIG. 5 shows the preferred embodiment of the invention, a neon transformer and midpoint connected lamp configuration with the addition of a return terminal M. The neon transformer of FIG. 5 has been modified from that in FIG. 4 to include a return terminal M connected to the midpoint terminal P3 of the transformer secondary. The midpoint terminal P3 is no longer connected to ground. The core C1 may or may not be connected with terminal P3 or M. During normal operations the flow of current will be as shown by path 50. The current will flow for half of the cycle from output terminal S2 through wire W2, neon tubes B3 and B4, through wire W4 to return terminal M, terminal P3 and winding TW2 to complete the path. For the other half of the cycle the current flow will be reversed. Similarly, for tubes B1 and B2, during normal operations the flow of current will be as shown by path 52. The current will flow for half of the cycle from output terminal S1 through wire W1, neon tubes B2 and B1, through wire W3 to return terminal M, terminal P3 and winding TW1 to complete the path. For the other half of the cycle the current flow will be reversed. Return terminal M is separated from ground by ground fault protection circuit SGFP. Block SGFP has connections to primary terminals P1 and P2, primary winding TW3, terminal GND, and the core C1 of transformer T1 which is in common with the mid-point terminal P3 and terminal M. Such an arrangement eliminates the possibility of creating false faults from current imbalances in either current loop 50 or 53 in the system. Housing 10 is connected to ground.

Figure 6:
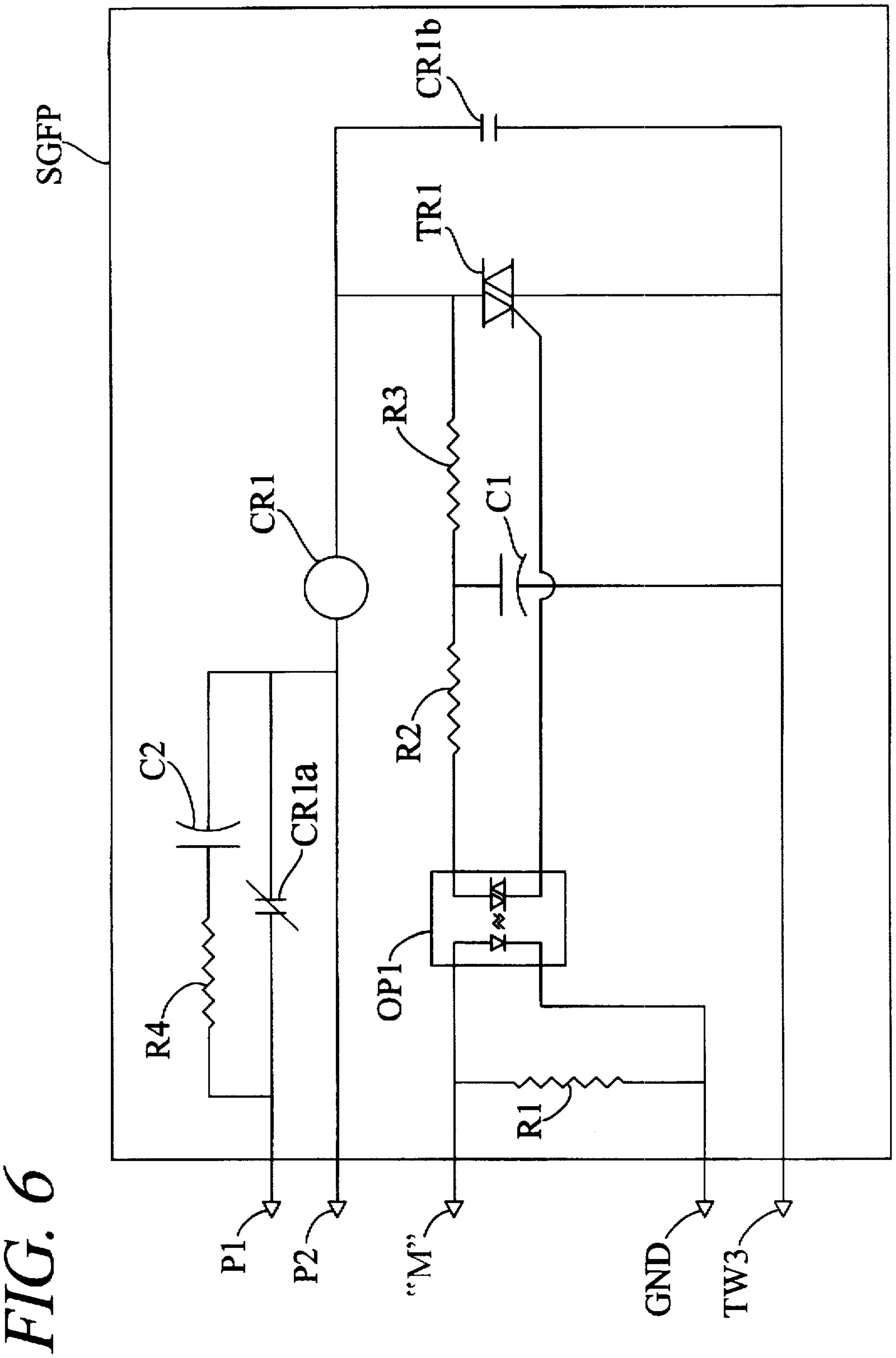
FIG. 6 is a diagram showing details of the ground fault protection circuit.

A secondary side fault path in this configuration would be detected if any current were to flow from either of the hot conductors W1 or W2 to ground and through the ground fault protection circuit SGFP back to the coil midpoint. This is illustrated by paths 51 and 53. Block SGFP contains a sensor means and a control means. FIG. 6 shows details of the secondary ground fault protection circuit SGFP. Resistor R1 is the sensor and is connected between terminal M and GND. Connected across resistor R1 is optoisolator OP1. The opto-isolator OP1 isolates the low voltage relay CR1. Resistor R2, R3 and C1 set the turn on point of triac TR1. Triac TR1 is connected to relay CR1. When triac TR1 triggers, relay CR1 opens the input power line on the primary side. Relay CR1 has contacts CR1*b* and CR1*a*. Series connected across contact CR1*a* is a resistor R4 and a capacitor C2.

The resistor R1 is used to sense the fault current and is connected between terminal M and ground. Ordinarily, lamp current in this application would use ground as a current path. Here, the terminal M is above ground potential with an impedance(resistor R1) separating M and ground. A secondary ground fault will be limited to the maximum current output of the transformer (20, 30, 60, 120 mA). For this current to get back to the secondary coil winding, it will have to pass through the impedance. The resulting voltage drop across the resistor R1 is measured and used to trigger relay CR1 in the input terminal lead of the primary winding. The relay CR1 in the SGFP block would open or close to disconnect the primary side of the circuit from the source of AC power (not shown). The actual magnitude of the voltage drop across the resistor R1 is relatively small since the currents involved are typically less than 100 mA. The primary line relay CR1 is configured to latch upon activation so that an input power reset is required to restart the transformer after it has tripped. The circuit reconnects the input power to the primary winding in response to cycling the input power from an off state to an on state. Notice here that the fault path current path is distinctly different than the normal current path. Thus ground fault currents are readily detectable. Further, any imbalance that occurs in the neon tube current paths in this midpoint connected tube configuration between the current flowing from terminal S2 to ground and from terminal S1 to ground will not appear as a ground fault to the circuit. The result is that unnecessary tripping of the ground fault protection circuit SGFP is eliminated. Such imbalances can easily occur as the lamps age and degrade.

The secondary coils TW1 and TW2 are arranged such that the two output voltage waveforms produced are 180° out of phase. Therefore, if there is a 7500 volt potential difference across each winding there will be a 15,000 volt difference across both windings TW1 and TW2. With a transformer design of FIG. 5 the following output conditions typically would exist:

1) The voltage from output terminal S1 to terminal M is 7500 V.
2) The voltage from output terminal S2 to terminal M is 7500 V.
3) The voltage from output terminal S1 to output terminal S2 is 15000 V.

This design will provide a secondary side ground fault protected neon transformer. This topology creates a scenario in which existing or new installations could employ mid-point connected tubing without fear of nuisance faults. It provides a product for replacement and/or new installations that use mid-point connected tube loads without concern for nuisance tripping of fault circuits. It provides for a cost effective method of improving neon transformer safety.

The present invention has been described in connection with a preferred embodiment. It will be understood that many modifications and variations will be readily apparent to those of ordinary skill in the art without departing from the spirit or scope of the invention and that the invention is not to be taken as limited to all of the details herein. Therefore, it is manifestly intended that this invention be limited only by the claims and the equivalents thereof.

What is claimed is:

1. A transformer assembly for powering a load, the assembly having a plurality of output terminals connectable to the load, the output terminals providing a high voltage to the load, the assembly comprising:

- a transformer, the transformer having a primary winding and at least one secondary winding, the secondary winding connected to the output terminals, the secondary winding further having a midpoint terminal;
- a housing, the housing containing the transformer;
- input terminal means connected to the primary winding and operable to receive a source of power;
- a ground terminal connected to an earth ground and to the housing;
- a return terminal connected to the mid-point terminal and to the load and operable to provide a return path which is separate from the earth ground;
- a ground fault protection circuit, the protection circuit connected between the ground terminal and the return terminal, the protection circuit operable to detect a fault current flowing between the output terminals and the earth ground, the protection circuit disconnecting the source of power from the primary winding in response to detecting the fault current.

2. The transformer assembly according to claim 1, wherein the load comprises a plurality of gas discharge lamps.

3. The transformer assembly according to claim 2, wherein the gas discharge lamps are connected in a midpoint connected lamp configuration.

4. The transformer assembly according to claim 1, wherein the ground fault protection circuit comprises:

sensor means connected between the return terminal and the ground terminal, the sensor means operable to detect the fault current flowing between the output terminals and the earth ground;

control means connected to the sensor means, the control means operable to disconnect the source of power from the primary winding in response to detecting the fault current such that the fault current is prevented from flowing.

5. The protection circuit according to claim 4, wherein the sensor means is a resistor.

6. The protection circuit according to claim 4, wherein the control means is a relay.

7. The protection circuit according to claim 4, wherein the control means reconnects the source of power to the primary winding in response to cycling the source of power from an off state to an on state.

8. A method of preventing a fault current from occurring in a high voltage power supply powering a load, the power supply connected to the load through a plurality of output terminals, the fault current flowing from the output terminals to an earth ground, comprising the steps of:

(a) providing a transformer, the transformer having a primary winding and at least one secondary winding, the secondary winding connected to the output terminals, the secondary winding further having a midpoint terminal;

(b) connecting an input terminal means to the primary winding, the input terminal means operable to receive a source of power;

(c) connecting a ground terminal to the earth ground;

(d) connecting a return terminal to the mid-point terminal and to the load such that the return terminal provides a return path which is separate from the earth ground;

(e) detecting the fault current flowing between the output terminals and the earth ground;

(f) disconnecting the source of power from the primary winding in response to detecting the fault current such that the fault current is prevented from flowing.

9. The method of preventing a fault current according to claim 8, wherein the load comprises a plurality of gas discharge lamps.

10. The method of preventing a fault current according to claim 9, wherein the gas discharge lamps are connected in a midpoint connected lamp configuration.

* * * * *